United States Patent [19]

Fukuda et al.

[11] Patent Number: 5,059,470

[45] Date of Patent: Oct. 22, 1991

[54] HEAT-SEALABLE LAMINATED POLYESTER FILM

[75] Inventors: Yujiro Fukuda, New York, N.Y.; Koji Utsunomiya, Nagahama, Japan

[73] Assignee: Diafoil Company, Ltd., Tokyo, Japan

[21] Appl. No.: 550,381

[22] Filed: Jul. 10, 1990

[51] Int. Cl.$^5$ .............................................. B32B 7/10
[52] U.S. Cl. ................................. 428/142; 428/147; 428/213; 428/335; 428/349; 428/480
[58] Field of Search .................... 428/480, 483, 35.2, 428/35.7, 34.9, 347, 349, 147, 149, 142, 141, 335, 213

[56] References Cited

U.S. PATENT DOCUMENTS 4,585,687  4/1986  Posey et al. .......................... 428/483
4,765,999  8/1988  Winter ................................. 428/349

FOREIGN PATENT DOCUMENTS 2222845  9/1987  Japan .
8008394  3/1980  United Kingdom .

*Primary Examiner*—Merrell C. Cashion, Jr.
*Assistant Examiner*—D. S. Nakarani
*Attorney, Agent, or Firm*—David G. Conlin; Peter F. Corless

[57] ABSTRACT

A heat-sealable laminated film is disclosed which comprises a heat-sealing layer formed of a copolyester and having a thickness of not less than 5 $\mu$m and a base layer formed of a copolyester containing the copolymerized unit common to the copolyester of the heat-sealing layer.

The film of this invention excels in heat-sealing strength, is extensively usable in applications for packaging, electric insulation, and industry in general, and has high industrial value.

10 Claims, No Drawings

HEAT-SEALABLE LAMINATED POLYESTER FILM

BACKGROUND OF THE INVENTION

This invention relates to a heat-sealable laminated polyester film. More particularly, the present invention relates to a heat-sealable laminated polyester film which preeminently excels in heat-sealing strength and also excels in workability.

The polyester film generally is excellent in strength and heat-resistance but is deficient in heat-sealability. When it is used for packaging, electric insulation, or industry in general, it must be given heat-sealability.

Heretofore in the fields of use mentioned above, films having a varying heat-sealable layer on one surface of a polyester film by the technique of lamination or the technique of coating have found utility. However, it is difficult by the coating technique to obtain sufficient heat-sealing strength of the produced film. In the case of the technique laminating another film, sufficient heat-sealing strength is not obtained by simply laminating a copolyester film of low crystallinity. When a film of other material than polyester is used for the lamination, this technique has the disadvantage that the process of molding is complicated and the production is unduly expensive. Particularly in recent years, a heat-sealable polyester film possessing high heat-sealing strength and warranting perfect safety as the material for lids in C-PET containers which are intended for use in electric ovens and the other ovens has been desired.

The present inventors have continued a diligent study in search of a way of fulfilling this desirability, to find that a laminated film of a specific layer composition possesses preeminent heat-sealing strength. Thus the present invention has been accomplished based on this finding.

SUMMARY OF THE INVENTION

In the present invention, there is provided a laminated film which comprises,

B layer comprising a polyester containing terephthalic acid unit of not less than 60 mol % based on the total amount of the dicarboxylic acid component, ethylene glycol unit of not less than 60 mol % based on the total amount of the diol component, and at least one of a copolymerized dicarboxylic acid unit other than the terephthalic acid unit and a copolymerized diol unit other than the ethylene glycol unit, and A layer comprising a polyester containing terephthalic acid unit of not less than 95 mol % based on the total amount of the dicarboxylic acid component, ethylene glycol unit of not less than 95 mol % based on the total amount of the diol component, and at least one of a copolymerized dicarboxylic acid unit other than the terephthalic acid unit and a copolymerized diol unit other than the ethylene glycol unit, at least one of the copolymerized dicarboxylic acid unit and said copolymerized diol unit being commonly contained in the polyester at A layer and the polyester of B layer, and the heat sealing strength between the B layers being not less than 400 g/15 mm width.

DETAILED DESCRIPTION OF THE INVENTION

The polyesters to be used for A layer and B layer in the laminated polyester film of the present invention are copolyesters having a terephthalic acid unit and an ethylene glycol unit as main components and additionally containing at least one other copolymerized unit.

The copolymerized unit which are usable herein for the copolyesters other than the terephthalic unit and the ethylene glycol unit include known dicarboxylic acids such as oxalic acid, malonic acid, succinic acid, adipic acid, azelaic acid, sebacic acid, 1,10-decanedicarboxylic acid, phthalic acid, isophthalic acid, naphthalenedicarboxylic acid, and diphenyl ether dicarboxylic acid and diols such as neopentyl glycol, propylene glycol, 1,4-butane diol, trimethylene glycol, propylene glycol, tetramethylene glycol, hexamethylene glycol, diethylene glycol, polyalkylene glycols, and 1,4-cyclohexane dimethanol, for example. One or more copolymerized unit may be usable.

Besides the dicarboxylic acid component and the diol component, the copolyesters may contain therein any of monofunctional compounds such as benzoic acid, benzoylbenzoic acid, methoxypolyalkylene glycols, and hidroxycarboxylic acids such as p-hydroxybenzoic acid and p-hydroxyethoxybenzoic acid, and polyfunctional compounds such as glycerin, and pentaerythritol in an amount such that the produced copolyester will be a substantially linear polymer.

B layer, viz. a heat-sealing layer, comprises a polyester containing not less than 60 mol %, based on the total amount of the dicarboxylic acid component, of terephthalic acid unit, not less than 60 mol %, based on the total amount of the diol component, of ethylene glycol unit, and at least one of a copolymerized dicarboxylic acid unit other than the terephthalic acid unit and a copolymerized diol unit other than the ethylene glycol unit. At least one of the content of the copolymerized dicarboxylic acid unit based on the total amount of the dicarboxylic acid component and the content of the copolymerized diol unit based on the total amount of the diol component is 6 to 40 mol %, preferably 10 to 40 mol %.

If the content of the copolymerized unit is less than 6 mol %, there arises the disadvantage that the film obtains no sufficient decrease in the melting point and acquires no sufficient heat-sealing strength. Conversely, if the content of the copolymerized unit exceeds 40 mol %, there is the disadvantage that the film tends to form curls.

The thickness of B layer is not less than 5 $\mu$m and is preferably in the range of 7 to 40 $\mu$m, more preferably 10 to 30 $\mu$m. If the thickness of the heat-sealing layer is less than 5 $\mu$m, there causes the disadvantage that the film suffers from heavy decrease in the heat-sealing strength and consequent impairment of practicality. In case the thickness of the heat-sealing layer is less than 5 $\mu$m, it is presumed that the stress exerted by tension upon the film tends to concentrate in the heat-sealing layer and induce cohesive failure, with the result that the heat-sealing strength of the film is lowered. If the thickness of the heat-sealing layer exceeds 40 $\mu$m, there arises the disadvantage that the overall strength of the laminated film is lowered.

A layer comprises a polyester containing not less than 95 mol %, based on the total amount of the dicarboxylic acid component, of terephthalic acid unit, not less than 95 mol %, based on the total amount of the diol component, of ethylene glycol unit, and at least one of a copolymerized dicarboxylic acid unit other than the terephthalic acid unit and a copolymerized diol unit other than the ethylene glycol unit. At least one of the content of the copolymerized dicarboxylic acid unit based on the total amount of the dicarboxylic acid component and the content of the copolymerized diol unit based on the total amount of the diol component is 0.5 to 5 mol %.

A layer contains as a common copolymerized unit at least one of the copolymerized dicarboxylic acid unit and the copolymerized diol unit which are contained in B layer.

At least one of content, in A layer, of the common copolymerized dicarboxylic acid unit based on the total amount of the dicarboxylic acid component and the content of the common copolymerized diol unit based on the total amount of the diol component is in 0.5 to 5 mol %, preferably 0.5 to 4 mol %, and more preferably 1 to 3 mol %.

If the content of the common copolymerized unit is less than 0.5 mol %, there is the disadvantage that the heat-sealed part of the film sustains cohesive failure under low force, that is, the strength of the heat seal is conspicuously low as compared with the tensile strength owned by the film itself.

The inventors presume that the cohesive failure occurring in the heat-sealed part of the film is caused owing to the local concentration of stress in the neighborhood of the joint of the heat-sealed part under the tension exerted to the film. It has been ascertained by the inventors that the strength of the heat-sealed part of the film is improved by causing A layer to contain not less than 0.5 mol % of at least one of the copolymerized unit contained in the B layer (the heat-sealing layer). This unexpected fact may be explained by a postulate that the added copolymerized unit accelerates integration of the heat-sealing layer (B layer) and the base layer (A layer) in the heat-sealed part, and moderates the concentration of stress in the joint of the heat-sealed part.

If the content of the copolymerized unit in A layer exceeds 5 mol %, there arises the disadvantage that the overall mechanical strength and heat-resistivity of the film are lowered.

The content of the common copolymerized unit in the B layer is preferably 6 to 40 mol %.

The compounds which are preferable as the common polymerized unit for A layer and B layer include isophthalic acid, adipic acid, sebacic acid, 1,10-decanedicarboxylic acid, neopentyl glycol, 1,4-butane diol, polyalkylene glycols, and 1,4-cyclohexane dimethanol. At least one common copolymerized unit described above may be contained for further enhancing the heat-sealing strength of the film.

The polyester may contain therein other polymer in an amount not exceeding 30% by weight.

For the purpose of enabling the film to acquire enhanced slipperiness, the polyester may contain therein an organic or inorganic slip additive in the form of fine powder. Optionally, it may further contain additives such as stabilizer, coloring agent, antioxidant, defoaming agent, and antistatic agent. The powders which are capable of providing the slipperiness include known inactive external particles such as kaolin, clay, calcium carbonate, silicon oxide, calcium terephthalate, aluminum oxide, titanium dioxide, calcium phosphate, lithium fluoride, and carbon black, high melting organic compounds and cross-linking polymer which do not melt when the polyester resin is melted and molded in the form of sheet, and internal particles which are formed inside polymers from metal compound catalysts for polyester synthesis such as alkali metal compounds and alkaline earth metal compound during the production of polyesters, for example. The content of the particles in each of the layers of the film is generally in the range of 0.005 to 0.9% by weight. The average particle size of the particles is generally in the range of 0.001 to 3.5 $\mu$m.

The heat-sealing strength between two polyester B layers is not less than 400 g/15 mm width, preferably not less than 500 g/15 mm width, and more preferably not less than 1000 g/15 mm width.

If the heat-sealing strength is less than 400 g/15 mm width, there arises the disadvantage that the film used as the material for the lid of the C-PET container intended for use in the electric oven or the other oven offers no sufficient heat-sealing strength and the lid is forced away the container by the pressure of the steam rising from the content at cooking.

The heat-sealing strength of the heat-sealed part formed between two B layers exhibits after treatment in hot water at 90° C. for 30 minutes is preferably not less than 100 g/15 mm width, more preferably not less than 200 g/15 mm width, and particularly not less than 300 g/15 mm width. When this heat-sealing strength obtained in the film is less than 100 g/15 mm width, the film becomes to be not practicable because of the same problem as mentioned above.

The glass transition temperature (Tg) of the B layer is preferably not lower than 40° C., and more preferably in the range of 50° to 100° C. If the Tg is less than 40° C., the film tends to encounter blocking during the storage thereof. If the Tg exceeds 100° C., the heat-sealability at low temperatures becomes to lower.

The degree of planar orientation of the outer surface of B layer is preferably not more than 0.020, more preferably not more than 0.010. If the degree of planar orientation exceeds 0.020, the heat-sealability of the film becomes low.

The average refractive index, $\bar{n}_1$, of B layer after the film has been biaxially stretched and heat-set and the average refractive index, $\bar{n}_0$, of the unstretched film in the substantially amorphous state obtained by rapidly cooling the polyester for B layer after melting preferably satisfy the following formula:

$$\bar{n}_1 \leq \bar{n}_0 + 0.005$$

If the value of $\bar{n}_1$ of the film exceeds ($\bar{n}_0 + 0.005$), the film tends not to acquire fully satisfactory heat-sealability.

The ratio of the maximum height (Rt) to the center line average roughness (Ra) of the outer surface of B layer is preferably not more than 20, more preferably in the range of 5 to 15. This ratio, Rt/Ra, is one of the characteristic values indicating the surface state of the film. The number of steep protuberance on the film surface increases as the ratio increases and the number of broad protuberance increases as the ratio decreases. If the ratio Rt/Ra of the film exceeds 20, the heat sealing tends to occur with insufficient fastness and the heat-sealed part tends to sustain cohesive failure with weak force. If the ratio Rt/Ra of the film is less than 5, the film becomes interior in slipperiness and workability.

It is the surface roughness of A layer that largely affects the slipperiness and workability of the film. In the film of the present invention, the center line average roughness (Ra) of the outer surface of A layer is preferably not less than 0.020 $\mu$m, more preferably in the range of 0.030 to 0.060 $\mu$m. If the Ra of the film is less than 0.020 μm, the film becomes interior in slipperiness and workability. If the Ra of the film exceeds 0.060 μm, the film tends not to retain the transparency which is required for the film to be used as packaging films.

The intrinsic viscosities of the polyesters forming A layer and B layer are preferably in the ranges of 0.40 to 0.70 and 0.50 to 0.80, respectively.

Though the thickness of the laminated film is not particularly limited, it is generally in the range of 6 to 400 μm.

The ratio of the thickness of A layer to that of B layer is preferably the range of 80:20 to 20:80.

Now, methods for the production of the film of this invention are described below. However, this invention is not particularly limited to these methods.

The production of the laminated film can be attained by any of known methods such as the coextrusion method, the extrusion-lamination method, and the dry lamination method, for example. Particularly, the coextrusion method is preferable from the standpoint of productivity because it is advantageous for the formation of the heat-sealing layer with a small thickness.

A coextrusion method for the production of the laminated film is described below.

The polyester (A) of A layer and the polyester (B) of B layer each optionally containing inorganic particles as a slip additive in a suitable amount are dried by the use of a hopper drier, a paddle drier, or a vacuum drier and melted in a respective extruder at a temperature in the range of 200° to 320° C. The two molten polyesters are laminated in a pipe or a spinneret, then, is extruded through the die and rapidly cooled to obtain an unstretched film. The extrusion may be carried out by the use of any known methods such as the T die method or the tubular method. The thickness ratio of the layers of the extruded laminated film may be suitably varied by adjusting the extruding amount of each of extruders. When the T die is employed for the extrusion of the unstretched film, use of the electrostatic cooling technique is a preferred way of obtaining a film of uniform thickness. The unstretched film obtained is then stretched at a temperature in the range of from $T_g - 10°$ C. to $T_c - 10°$ C. in the machine direction and/or the transverse direction in a stretch ratio of 1.1 to 50, preferably 6 to 30 times by area (wherein $T_g$ and $T_c$ stand respectively for the glass transition temperature and the crystallizing temperature during rise of temperature of the polyester A). This stretching may be performed uniaxially or biaxially, depending on the use of the film. In the case of the biaxial stretching, it may be carried out in the sequential manner, the simultaneous manner, or the manner combining both. In the case of the sequential biaxial stretching, generally the procedure which comprises first stretching in the machine direction and then stretching in the transverse direction is adopted preferably. Optionally, the biaxially stretched film may be stretched again in the machine direction and/or the transverse direction before it is subjected to the next step of heat treatment.

The film which has been uniaxially or biaxially stretched as described above is optionally subjected to heat treatment in the heat-setting zone at 100° to 260° C. for 1 second to 10 minutes. The maximum temperature of this heat treatment is preferably not lower than (the melting point of the polyester B − 10° C.) and not higher than 260° C.

The heat treatment is generally performed on the film while the film is fixed. It is permissible for the film to be relaxed or tentered to an extent of not more than 20% in the machine and/or transverse direction of the film during the heat treatment and/or during the cooling treatment which follows the heat treatment.

The adhesiveness of the film to other layer such as a printing layer may be improved by subjecting either or both of the outer surfaces of the film to a corona discharge treatment during, before, or after the step of stretching.

It is also permissible to improve the film in adhesiveness, antistatic property, slipperiness, and light shielding property by subjecting either or both of the outer surfaces of the film to a coating treatment during, before, or after the step of stretching.

The film thus produced is wound up as a finished product.

When the requirements of this invention described above are satisfied, a highly heat-sealable polyester film of conspicuously improved heat-sealing strength can be obtained.

The film of the present invention can be heat-sealed in accordance with the conventional method generally employed for heat-sealing polyester films.

The film of the present invention excels in heat-sealing strength and is extensively usable in applications for packaging, electric insulation, and industry in general, and has high industrial value.

The present invention will be described more specifically in the following examples. However, this invention is not limited to these examples otherwise without departing from the scope of the invention.

The films were evaluated for various properties by the following procedures:

(1) Glass transition temperature (Tg)

After melting a sample polymer under a current of nitrogen gas at 300° C. for 5 minutes, and then the molten polymer was rapidly cooled into an amorphous state. The glass transition temperature of the polymer was measured by a differential calorimeter SSC580.DSC20 (trade name, Seiko Electronics Corporation) at a temperature increasing rate of 4° C./min.

(2) Degree of planar orientation (ΔP) and average refractive index ($\bar{n}$)

The maximum value of refractive index, nγ, in the surface of a sample film, the refractive index, nβ, in the direction perpendicular thereto, and the refractive index, nα, in the direction of thickness of the film were measured by an Abbe's refractometer (Atago Kogakusha K.K.) with the sodium D line at 23° C., and calculating the average refractive index and the degree of planar orientation in accordance with the following formulas:

$$\Delta P = \tfrac{1}{2}(n\gamma + n\beta) - n\alpha$$

$$\bar{n} = \tfrac{1}{3}(n\alpha + n\beta + n\gamma)$$

(3) Center line average roughness (Ra)

The surface of a film was measured by a surface roughness meter SE-3F (trade name, Kosaka Kenkyusho K.K.). A portion of the standard length L (2.5 mm) in the direction f center line was sampled from the cross section curve of the film. The sampled portion was expressed as the roughness curve, y = f(x), while taking the center line of the sampled portion on the x axis and the longitudinal direction on the y axis. The value (μm) was given by the following formula:

$$Ra = \frac{1}{L}\int_0^L |f(x)|dx$$

The average roughness in the center line of a film was determined by finding 10 cross section curves n the surface of a sample film, and averaging the values of center-line average roughness of the portions sampled from the cross section curves. The radius of the tip of the probe was 2 μm, the load applied to the probe tip was 30 mg, and the cutoff value was 0.08 mm.

(4) Maximum height (Rt)

The maximum height was expressed by the difference between the maximum value and the minimum value of the sampled portion obtained in the determination of the center line average roughness described above.

Rt (μm) shown here is the average of the measurements at total 10 points.

(5) Heat-sealing strength

The heat-sealing strength of a film was determined by taking two pieces from the given film, superposing the cut pieces in such manner that their B layers would come into direct contact, heat-sealing them at 145° C. under 2 kgf for 1 second with a heat seal tester TP701 (trade name, Tester Sangyo K.K.) using a heat seal bar (15 mm×300 mm), cutting out a heat-sealed part in a width of 15 mm, and subjecting the heat-sealed part to a peel test at a peel rate of 500 mm/min with an angle of 90°.

No matter whether the heat-sealed part was separated through boundary peeling or through cohesive failure, the magnitude of initial stress due to the peel strength was reported as the heat-sealing strength (g/15 mm width).

Separately, a test piece was cut out of the heat-sealed part obtained in the same manner as the preceding test, treated with hot water at 90° C. for 30 minutes, and tested for heat-sealing strength (g/15 mm width) under the same conditions.

(6) Intrinsic viscosity

Measured in a 50/50 (by weight) mixture of phenol and tetrachloroethane at a concentration of 1.0 g/cm$^3$ and 30° C.

EXAMPLES 1 AND 2

As the material for A layer, a copolyester (A1) (intrinsic viscosity 0.65) comprising a dicarboxylic acid component consisting of 98.5 mol % of terephthalic acid unit and 1.5 mol % of isophthalic acid unit and a diol component consisting solely of ethylene glycol unit and containing 700 ppm of amorphous silica particles having an average particle size of 1.4 μm was used.

As the material for B layer, a copolyester (B1) (intrinsic viscosity 0.70) comprising a dicarboxylic acid component consisting of 80 mol % of terephthalic acid and 20 mol % of isophthalic acid unit and a diol component consisting of 97 mol % of ethylene glycol unit and 3 mol % of diethylene glycol and containing 300 ppm of amorphous silica particles having an average particle size of 1.4 μm was used.

The polyesters (A1) and (B1) were separately dried and melted in respective extruders at 290° C. The molten polyesters were laminated within a pipe, extruded by the technique of coextrusion, and rapidly cooled, to obtain an unstretched film. This untreated film was stretched between heating rolls of 85° C. and cooling rolls to 3.6 times in the machine direction stretched with the tenter at 100° C. to 4.0 times in the transverse direction, heat-treated at 230° C. for 10 seconds, and then relaxing in a cooling zone at 180° C. in a ratio of 3% in the transverse direction. In the films obtained in two test runs using the procedure described above, the thicknesses of the polyester (A1) layer and the polyester (B1) layer were 13 μm/7 μm (Example 1) and 8 μm/12 μm (Example 2).

COMPARATIVE EXAMPLE 1

A film consisting of a layer of polyester (A1) 17 μm in thickness and a layer of polyester (B1) 3 μm in thickness was obtained according to the procedure of Example 1.

EXAMPLE 3

As the material for A layer, a copolyester (A2) (intrinsic viscosity 0.60) comprising a dicarboxylic acid component consisting solely of terephthalic acid unit and a diol component consisting of 97 mol % of ethylene glycol unit, 2 mol % of neopentyl glycol unit, and 1 mol % of diethylene glycol unit and containing 1,200 ppm of synthetic calcium carbonate particles having an average particle size of 0.9 μm was used. As the material for B layer, a copolyester (B2) (intrinsic viscosity 0.66) comprising a dicarboxylic acid component consisting solely of terephthalic acid unit and a diol component consisting of 85 mol % of ethylene glycol unit and 15 mol % of neopentyl glycol unit and containing 400 ppm of kaolin particles having an average particle size of 1.3 μm was used.

A film was produced by subjecting the polyester (A2) and the polyester (B2) to the steps of drying, extrusion, and stretching in the same manner as in Example 1 and subjecting the produced stretched film to heat treatment as fixed at 240° C. for 6 seconds. In the produced film, the layer of polyester (A2) had a thickness of 10 μm and the layer of polyester (B2) had a thickness of 23 μm.

COMPARATIVE EXAMPLE 2

A polyethylene terephthalate (A3) (intrinsic viscosity 0.65) containing the same particles as used in the copolyester (A1) was used as the material for A layer and the copolyester (B1) was used as the material for B layer From the polyesters (A3) and (B1), a film comprising a layer of polyester (A3) of 13 μm in thickness and a layer of polyester (B1) 7 μm in thickness was obtained by following the procedure of Example 1.

The films obtained in the working examples and comparative examples were tested for physical properties. The results are shown in Table 1.

TABLE 1

|  | Example 1 | Example 2 | Comparative Example 1 | Example 3 | Comparative Example 2 |
| --- | --- | --- | --- | --- | --- |
| Heat sealing strength (g/15 mm width) | 520 | 1030 | 280 | 2080 | 370 |
| Heat sealing strength after treatment in | 310 | 560 | 95 | 1120 | 180 |

TABLE 1-continued

|  | Example 1 | Example 2 | Comparative Example 1 | Example 3 | Comparative Example 2 |
|---|---|---|---|---|---|
| hot water (g/15 mm width) |  |  |  |  |  |
| Ra of polyester A layer surface (μm) | 0.037 | 0.038 | 0.036 | 0.035 | 0.037 |
| Ra of polyester B layer surface (μm) | 0.035 | 0.036 | 0.033 | 0.039 | 0.035 |
| Rt of polyester B layer surface (μm) | 0.390 | 0.365 | 0.403 | 0.348 | 0.390 |
| Rt/Ra of polyester B layer surface | 11.1 | 10.1 | 12.2 | 8.9 | 11.1 |
| ΔP of polyester B layer | 0.001 | 0.001 | 0.001 | 0.003 | 0.001 |
| $\bar{n}_1 - \bar{n}_0$ of polyester B layer | 0.001 | 0.001 | 0.001 | 0.002 | 0.001 |

The film of Comparative Example 1 was undesirable because the thickness of the B layer of polyester was thin and consequently the heat-sealing strength of the film was unduly low. The film of Comparative Example 2 was undesirable because the composition of the polyester of the A layer did not satisfy the requirements of the present invention and consequently the heat-sealing strength of the film was low.

In contrast, the films of Examples 1 to 3 possessed fully satisfactory heat-sealing strength.

What is claimed is:

1. A laminated film which comprises,
   B layer comprising a polyester containing terephthalic acid unit of not less than 60 mol % based on the total amount of the dicarboxylic acid component, ethylene glycol unit of not less than 60 mol % based on the total amount of the diol component, and at least one of a copolymerized dicarboxylic acid unit other than the terephthalic acid unit and a copolymerized diol unit other than the ethylene glycol unit, and
   a layer comprising a polyester containing terephthalic acid unit of not less than 95 mol % based on the total amount of the dicarboxylic acid component, ethylene glycol unit of not less than 95 mol % based on the total amount of the diol component, and at least one of a copolymerized dicarboxylic acid unit other than terephthalic acid unit and a copolymerized diol unit other than ethylene glycol unit,
   at least one of said copolymerized dicarboxylic acid unit and said copolymerized diol unit being commonly contained in said polyester of A layer and said polyester of B layer,
   the thickness of said B layer being not less than 5 μm and not exceeding 40.
   a degree of planar orientation of an outer surface of said B layer being not more than about 0.020.
   the ratio of the thickness of said A layer to the thickness of said B layer being from about 80:20 to 20:80, and
   a heat sealing strength when said B layer heat-sealed to itself being not less than 400 g/15 mm width.

2. A laminated film according to claim 1, wherein at least one of the content, based on the total amount of the dicarboxylic acid component, of said copolymerized dicarboxylic acid unit in the polyester of said B layer and the content, based on the total amount of the diol component, of said copolymerized diol unit in the polyester of said B layer is 6 to 40 mol %.

3. A laminated film according to claim 1, wherein at least one of the content, based on the total amount of the dicarboxylic acid component, of said copolymerized dicarboxylic acid unit in the polyester of said A layer and the content, based on the total amount of the diol component, of said copolymerized diol unit in the polyester of said A layer is 0.5 to 5 mol %.

4. A laminated film according to claim 1, wherein at least one of the content, based on the total amount of the dicarboxylic acid component, of said copolymerized dicarboxylic acid unit contained commonly in the polyester of said B layer and said polyester of said A layer and the content, based on the total amount of the diol component, of said copolymerized diol unit contained commonly in the polyester of said B layer and said polyester of said A layer is 6 to 40 mol % in the polyester of said B layer and 0.5 to 5 mol % in the polyester of said A layer.

5. A laminated film according to claim 1, wherein said copolymerized unit contained commonly in the polyesters of said B layer and said A layer is at least one compound selected from the group consisting of isophthalic acid, adipic acid, sebacic acid, 1,10-decanedicarboxylic acid, neopentyl glycol, 1,4-butane diol, polyalkylene glycols, and 1,4-cyclohexane dimethanol.

6. A laminated film according to claim 1, wherein the heat-sealing strength when said B layer heat-sealed to itself after a treatment at 90° C. for 30 min is not less than about 100 g/15 mm width.

7. A laminated film according to claim 1, wherein the glass transition temperature of said B layer is not lower than about 40° C.

8. A laminated film according to claim 1, wherein the average refractive index, $\bar{n}_1$, of said B layer after the film is biaxially stretched and heat-set and the average refractive index, $\bar{n}_0$, of the unstretched film in the substantially amorphous state for satisfy the following formula:

$$\bar{n}_1 \leq \bar{n}_0 + 0.005$$

9. A laminated film according to claim 1, wherein the ratio of the maximum height (Rt) to the average roughness (Ra) of the outer surface of said B layer is not more than about 20.

10. A laminated film according to claim 1, wherein the center line average roughness of the outer surface of said A layer is not less than about 0.020 μm.

* * * * *

UNITED STATES PATENT AND TRADEMARK OFFICE
CERTIFICATE OF CORRECTION

PATENT NO. : 5,059,470

DATED : October 22, 1991

INVENTOR(S) : Fukuda et al.

It is certified that error appears in the above-identified patent and that said Letters Patent is hereby corrected as shown below:

On the title page, left-hand column, below date of application filing, please insert the following:

[30]  Foreign Application Priority Data
      Jul. 14, 1989 [JP] Japan  ............ 1-181706

Signed and Sealed this

Thirtieth Day of March, 1993

*Attest:*

STEPHEN G. KUNIN

*Attesting Officer*      *Acting Commissioner of Patents and Trademarks*